No. 719,216. PATENTED JAN. 27, 1903.
E. HENTSCHEL.
COMPOSITION FOR DIGESTER LININGS.
APPLICATION FILED SEPT. 16, 1902.
NO MODEL.
Stebbins, 528,400, Oct. 30, 1894, 92, Digesters.
Mixer, 326,317, Sept. 15, 1885, 106-30
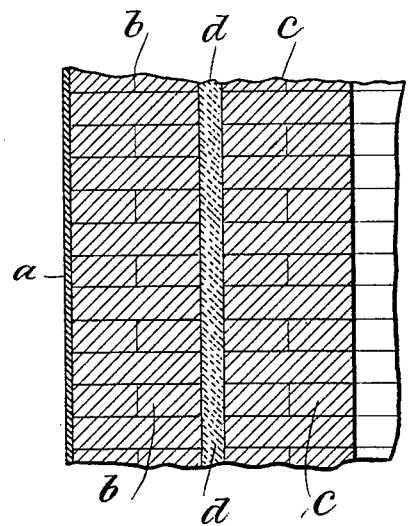
Witnesses
Chas H. Smith
J. Staib
Inventor
Ernst Hentschel
per L. W. Serrell & Son
atty

UNITED STATES PATENT OFFICE.

ERNST HENTSCHEL, OF MUSKEGON, MICHIGAN.

COMPOSITION FOR DIGESTER-LININGS.

SPECIFICATION forming part of Letters Patent No. 719,216, dated January 27, 1903.

Application filed September 16, 1902. Serial No. 123,561. (No specimens.)

*To all whom it may concern:*

Be it known that I, ERNST HENTSCHEL, a citizen of the United States, residing at Muskegon, in the county of Muskegon and State of Michigan, have invented an Improvement in Compositions for Digester-Linings, of which the following is a specification.

My invention relates to an acid-proof composition to be employed in the construction of lining of digesters used in connection with the manufacture of paper-pulp or paper-stock. These digesters are of metal lined with brick, and the acid employed in the treatment of the paper-stock percolates through the brick lining and attacks the metal shell, gradually destroying the same; and the object of my invention is to prevent the acid reaching the metal shell.

In carrying out my invention the composition material employed by me and which constitutes my invention is to be placed between the linings of the digester.

My improved acid-proof composition consists of litharge, Portland cement, quartz or crushed fire-brick, glycerin, and silicate of soda. These materials are employed in substantially the following proportions and weights and are compounded in substantially the following manner: I take about equal proportions, by bulk, of litharge, Portland cement, and quartz or crushed fire-brick, or, otherwise stated, by weight, about two hundred pounds of litharge, about one hundred pounds of Portland cement, and about one hundred pounds of quartz or crushed fire-brick. These are in a dry state and are thoroughly and intimately mixed. To a quantity of such mixture as would fill an ordinary barrel, and therefore would weigh about four hundred pounds, I add the glycerin and silicate of soda. The quantity of glycerin employed is about twenty gallons, and the silicate of soda about four and one-half gallons, these two substances being thoroughly mixed and then added to the dry mixture of litharge, Portland cement, and quartz or crushed fire-brick, so as to thoroughly moisten and reduce said dry materials to a thin pasty consistency.

To identify the application of my improved composition, I have illustrated the walls of a digester, in which $a$ represents the shell of metal, $b$ the first lining of brick, and $c$ the second lining of brick. Between these linings there is a vertical space which may be of any desired width, and this space conforms in cross-sectional area to the shape or form of the digester and its lining. This space is filled in solid with my improved composition, which thereafter dries and hardens and forms an impenetrable acid-proof lining to the digester to such an extent that whatever acid may percolate through the inner brick lining $c$ does not pass through the lining $d$ of my improved composition, or even reach the brick lining $b$.

I claim as my invention—

1. The herein-described composition as a lining for digesters, consisting of litharge, Portland cement, quartz or crushed fire-brick, glycerin and silicate of soda.

2. The herein-described composition as a lining for digesters, consisting of litharge, Portland cement, quartz or crushed fire-brick, and glycerin and silicate of soda, in about the proportions of two hundred pounds of litharge, one hundred pounds of Portland cement and one hundred pounds of quartz or crushed fire-brick, and a mixture of about twenty gallons of glycerin and about four and one-half gallons of silicate of soda added to said quantity of the aforesaid materials in a dry state.

Signed by me this 7th day of August, 1902.

ERNST HENTSCHEL.

Witnesses:
W. L. SAWYER,
W. H. NEWTON.